Nov. 1, 1955  R. G. FOX  2,722,342
CONTROL FOR INFLATING PNEUMATIC LIFE PRESERVING APPARATUS
Filed Nov. 1, 1952
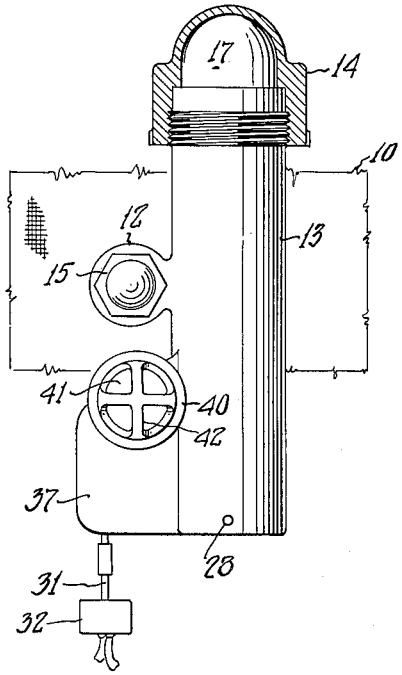
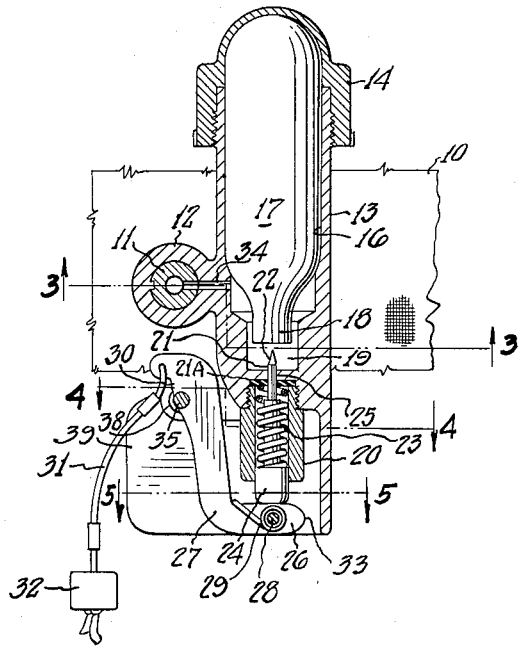
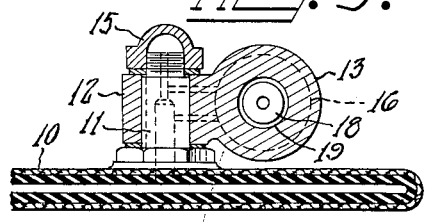
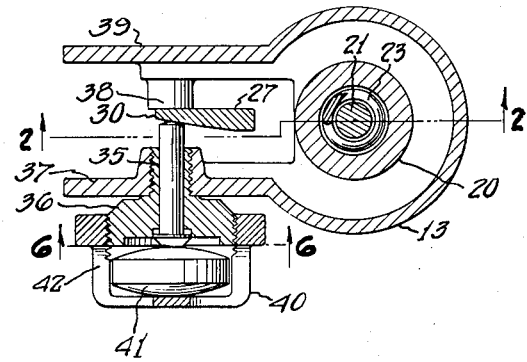
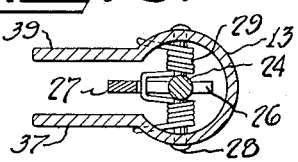
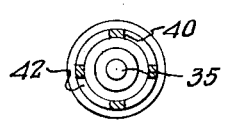
INVENTOR
ROBERT G. FOX
BY
ATTORNEY

2,722,342
CONTROL FOR INFLATING PNEUMATIC LIFE PRESERVING APPARATUS

Robert G. Fox, Lake Grove, Oreg.

Application November 1, 1952, Serial No. 318,283

3 Claims. (Cl. 222—5)

This invention relates generally to life preserving apparatus and particularly to an inflator therefor.

The main object of this invention is to provide a simple and positive manual and also automatic operation of the inflating device.

The second object is to provide a means for insuring complete and perfect operation regardless of surrounding temperatures and conditions.

The third object is to provide a special form of actuating means which will be easy to manufacture.

Attention is drawn to my co-pending application, Serial Number 244,068, filed August 28, 1951, now Patent No. 2,684,784, over which the device described herein is an improvement.

These and other objects are accomplished in the manner set forth in the following specification as illustrated in the accompanying drawing, in which:

Fig. 1 is a side elevation of the device with a portion broken away in longitudinal section.

Fig. 2 is a view similar to Fig. 1 but taken in longitudinal section.

Fig. 3 is a transverse section taken along the line 3—3 in Fig. 2.

Fig. 4 is a section taken along the line 4—4 in Fig. 2, at a somewhat enlarged scale.

Fig. 5 is a section taken along the line 5—5 in Fig. 2.

Fig. 6 is a section taken along the line 6—6 in Fig. 4.

Like numbers of reference refer to the same or similar parts throughout the several views.

Referring in detail to the drawing, there is shown a fragment 10 of a life belt or raft to which air is normally supplied through the nipple 11.

The device itself is comprised of a sleeve 12 which is keyed to the nipple 11 and is integral with the cylindrical body 13 of the device. The body 13 has a cap 14 threaded on one end thereof. A cap nut 15 is mounted on the sleeve 12.

The body 13 has formed therein a cylindrical chamber 16 in which is disposed a cartridge 17 of volatile gas, such as carbon dioxide. The cartridge 17 has a small neck 18 which extends into a smaller chamber 19 but is spaced from the walls and ends thereof.

The body 13 has threaded into one end thereof an extension 20 in which is slidably mounted the firing pin 21 whose point 22 is urged away from the cartridge neck 18 by a spring 23 which is mounted on the pin 21 between the pin head 24 and the end wall 25 through which the pin 21 projects. A sealing washer 21–A is placed between the members 13 and 20 around the pin 21. The pin head 24 rests against the end 26 of the bellcrank lever 27 which is pivoted on the rivet 28 and urged by a spring 29 on the rivet 28 to move the wedge-shaped lever end 30 in an outward direction.

Attached to the lever end 30 is a cord 31 at the opposite end of which is a button 32 by means of which the cord 31 may be pulled manually, thereby causing the cam tip 33 on the end 26 to force the point 22 into the neck of the cartridge 17 and permit its gaseous contents to escape into the chamber 19 and thence through the port 34 and in the nipple 11 and thence into the life belt 10. Movement of the lever end 30 is ordinarily prevented by a trigger pin 35 which is slidably mounted in the plug 36 which is threaded into the projection 37 of the body 13. The anvil 38 is formed on the opposite projection 39 of the body 13. The anvil 38 and pin 35 are in axial alignment. Threaded onto the plug 36 is a hollow cap 40 which is removable and contains a tablet 41 which dissolves in water. The cap 40 is provided with a number of holes 42 through which water can reach the tablet 41.

The operation of the device is as follows: When in readiness for use a tablet 41 is put into place with the lever 27 in the position shown in Fig. 2. If it is desired to inflate the raft before striking the water, the operator merely pulls the cord 31 and forces the wedge-shaped lever end 30 between the anvil 38 and the trigger pin 35, thereby forcing the pin 35 into the frangible tablet 41 which collapses and falls through the opening 43 in the end of the cap 40. This action permits the point 22 to pierce the cartridge 17 as stated.

The same result is obtained automatically when the device is in the water which dissolves the cartridge 17 and allows the lever 27 to be pushed outwardly by the spring 29.

I claim:

1. An inflating device having in combination a chambered body provided with outlet connections to a life belt, a gas cartridge in said chamber, a firing pin mounted in said body adjacent to said cartridge, a spring on said firing pin urging said pin away from said cartridge, a cam mounted in said body forming an outward stop for said pin and having its cam surface engageable with said pin, said cam having an actuating lever, a portion of which is wedge-shaped with its point leading when said lever is moving said cam in a pin moving direction, a spring urging said cam and lever toward pin actuating position, an anvil supported by said body bearing against one side of said wedge-shaped portion, a trigger spaced from said anvil and bearing against the opposite side of said wedge-shaped portion, a soluble tablet holding said trigger in said bearing engagement against said lever, and means for actuating said cam manually.

2. In an inflating device, a body having a chamber for a gas cartridge, a pointed pin slidably mounted in said body to puncture a cartridge in said chamber, a movable pin actuating member having a wedge-shaped portion, a spring urging said member toward pin actuating position, a trigger pin mounted for movement transversely of the movement of said member, and means for holding a soluble tablet against one end of said trigger pin, the other end of said trigger pin when so held bearing against said wedge-shaped portion of said member and preventing movement of said member to actuate said pointed pin, the dissolving of said tablet releasing said member for automatic actuation of said pointed pin, and forcible manual movement of said member moving said trigger pin to crush the tablet and permit continued movement of said member to actuate said pointed pin.

3. In an inflating device, a body having a chamber for a gas cartridge, a puncture pin for puncturing a cartridge in said chamber, a pivotally mounted actuating lever for said pin, a spring connected with said lever for imparting actuating movement thereto, a wedge surface on said lever inclined in the direction of actuating movement of said lever, a trigger pin mounted in said body for movement parallel with the pivotal axis of said lever in the path of movement of said wedge surface, means on said body for holding a soluble tablet against said trigger pin to press said trigger pin against said wedge surface, said trigger pin thus held preventing actuating movement of said lever by said spring, the dissolving of said tablet permitting retraction of said trigger pin by said lever and actuating movement of said lever, and manual means for forcibly actuating said lever causing said trigger pin to break said tablet.

References Cited in the file of this patent

UNITED STATES PATENTS

| | | | |
|---|---|---|---|
| 1,329,990 | Muller | Feb. 3, | 1920 |
| 2,073,688 | Freygang | Mar. 16, | 1937 |
| 2,194,442 | Grant | Mar. 19, | 1940 |
| 2,527,605 | Walk | Oct. 31, | 1950 |
| 2,627,998 | Musser et al. | Feb. 10, | 1953 |
| 2,684,784 | Fox | July 27, | 1954 |